Dec. 23, 1958 A. V. COLLIER 2,865,192
SCARFING MACHINE
Filed Oct. 31, 1957 3 Sheets-Sheet 1

INVENTOR:
ALBERT V. COLLIER
BY Howson & Howson
ATTYS.

Dec. 23, 1958  A. V. COLLIER  2,865,192
SCARFING MACHINE
Filed Oct. 31, 1957  3 Sheets-Sheet 2
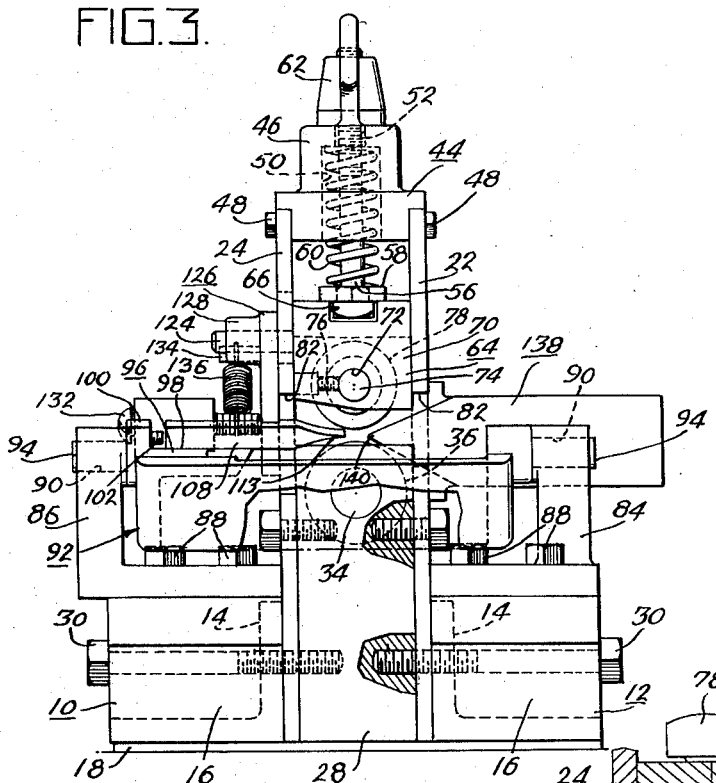
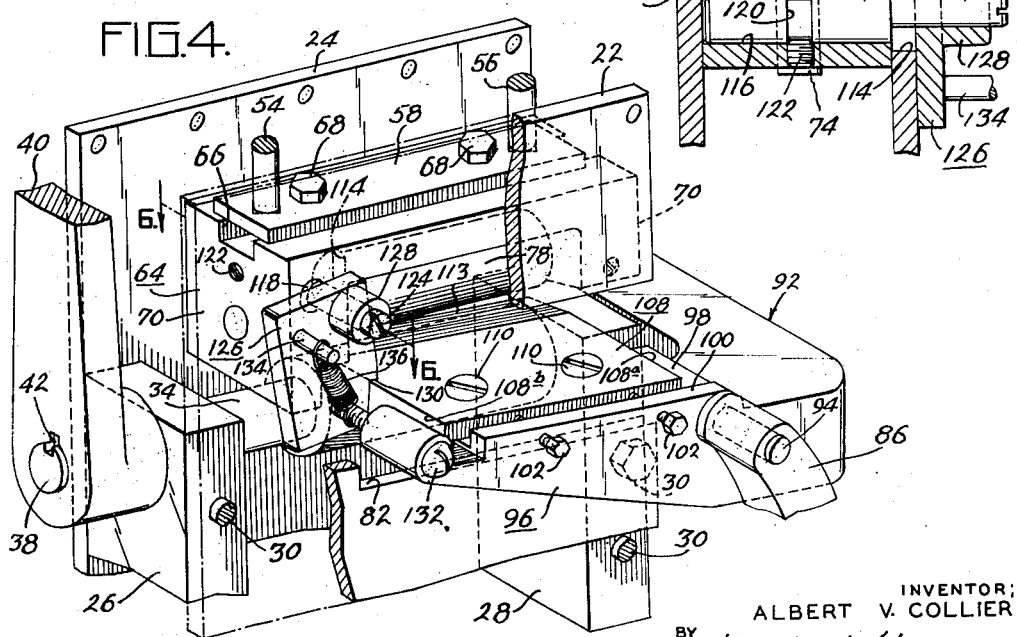
INVENTOR;
ALBERT V. COLLIER
BY Howson & Howson
ATTYS.

Dec. 23, 1958
A. V. COLLIER
2,865,192
SCARFING MACHINE
Filed Oct. 31, 1957
3 Sheets-Sheet 3
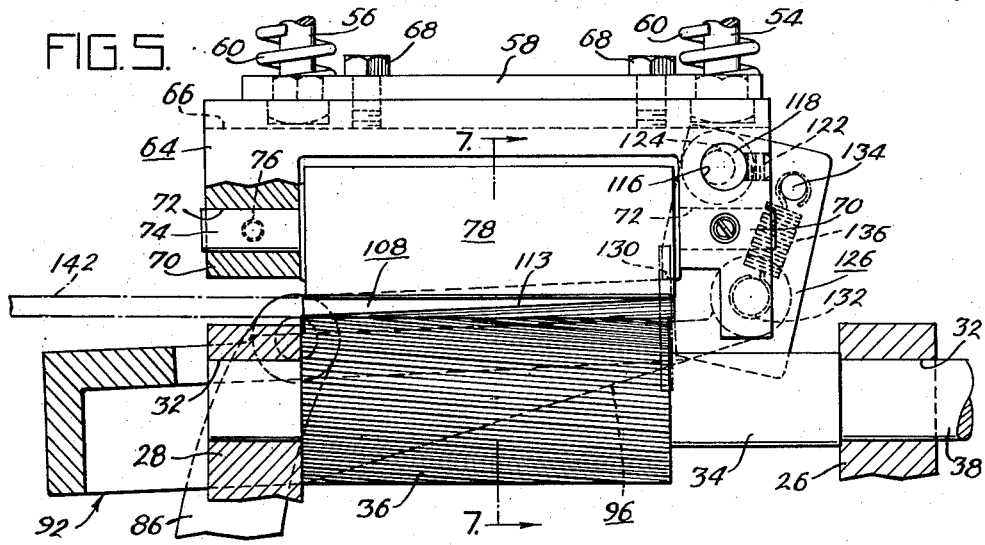
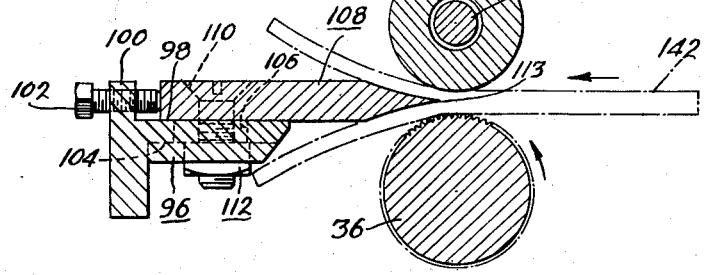
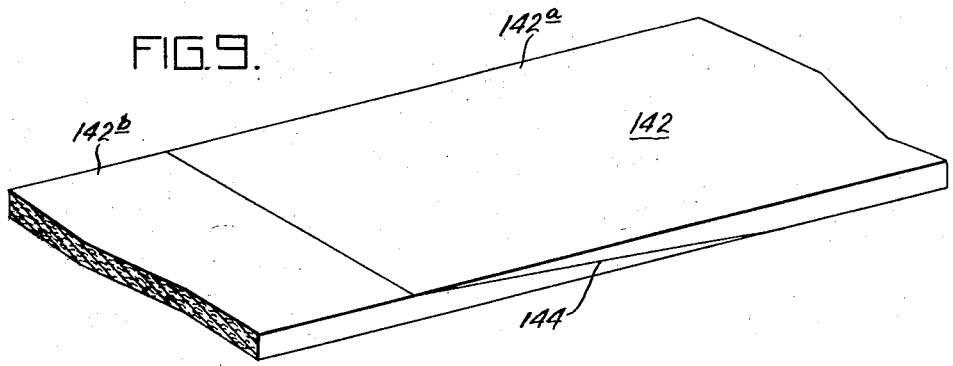
INVENTOR:
ALBERT V. COLLIER
BY
Howson & Howson
ATTYS.

United States Patent Office 2,865,192
Patented Dec. 23, 1958

2,865,192

SCARFING MACHINE

Albert V. Collier, Philadelphia, Pa., assignor to Nelson J. Katz, Philadelphia, Pa.

Application October 31, 1957, Serial No. 693,753

5 Claims. (Cl. 69—13)

The present invention relates broadly to scarfing machines, and more specifically to machines adapted for scarfing of flat leather transmission belting.

The use of flat leather transmission belting for machinery drives many times poses a problem to a maintenance mechanic and/or distributor, in making an endless belt or when repairs of endless belts are required.

The present invention provides a scarfing machine adapted for bench mounting which is simple to use, saves labor and time, and requires little or no maintenance.

An object of the invention is to provide an improved machine to cut the tapered lap necessary to join the ends of a belt and which is adapted for bench mounting and either hand or power operation.

Another object of the invention is to provide a scarfing machine wherein the tapered cut is made simply by inserting the belt end and turning a crank, and necessitating no experienced operator.

A further object of the present invention is to provide a scarfing machine of a simple and sturdy construction adapted to accommodate different thicknesses of belt, and which is operable through any range of belt width.

A still further object of the present invention is to provide a scarfing machine necessitating only two adjustments, namely, for belt thickness, and which adjustment is not critical, and point thickness.

An additional object of the present invention is to provide a scarfing machine including an angularly adjustable knife for varying the angle of cut or taper for flat leather transmission belting, including coarse and fine adjustment mechanism for properly positioning the knife and setting the angle of the knife respectively.

A still further object of the invention is to provide a scarfing machine which, regardless of the thickness of the belt, will always make a skive of equal length for all thicknesses of belt by automatically varying the angle of cut dependent upon belt thickness.

Additional objects and advantages of the invention will be more readily apparent from the following detailed discussion of an embodiment thereof when taken together with the accompanying drawings in which:

Fig. 3 is an end elevational view of the scarfing machine, parts being broken away and in section for clarity;

Fig. 4 is a fragmentary perspective view of a portion of the machine directed to the mounting, operation and adjustment of the knife;

Fig. 5 is a fragmentary elevational view of a portion of the machine depicting operation thereof;

Fig. 6 is a sectional view taken on line 6—6 of Fig. 4;

Fig. 7 is a partial sectional view taken on line 7—7 of Fig. 5;

Fig. 8 is a fragmentary enlarged sectional view of a portion of a fluted feed roll used in the present machine; and Fig. 9 is a perspective view showing a scarf joint in a flat leather transmission belt.

Figure 1:
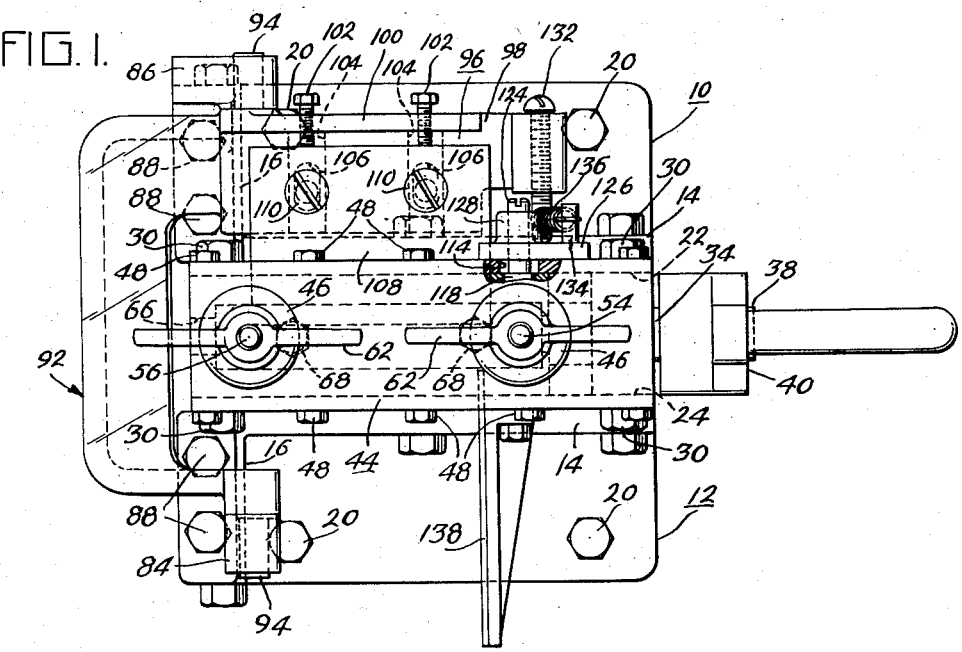
Fig. 1 is a top plan view of the scarfing machine of the present invention.
Figure 2:
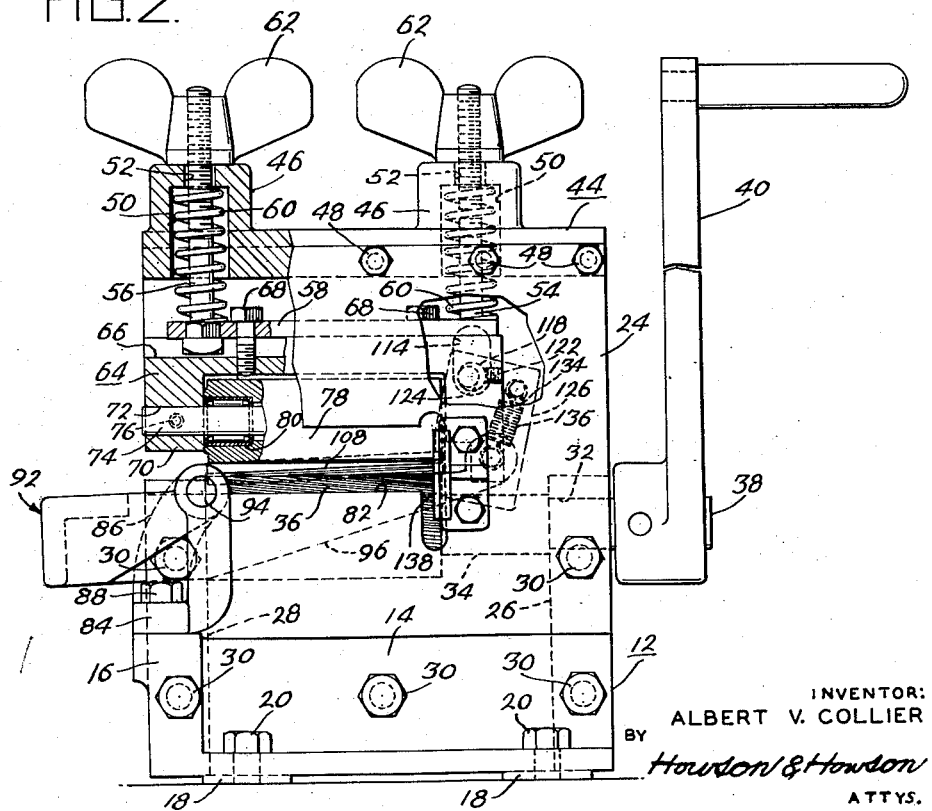
Fig. 2 is a side elevational view of the scarfing machine, parts being broken away and in section for clarity of details.

Referring now more particularly to the drawings, the scarfing machine of the present invention includes a base member consisting of right-hand and left-hand base portions 10 and 12, respectively, each having an upstanding longitudinal flange 14 and an upstanding end flange 16. Skids or legs 18 are formed on the base portions and openings are provided for reception of bolts or the like 20 for securing the portions to a bench or other working surface.

Vertically arranged side plates 22 and 24 are placed in abutment with the longitudinal flanges 14 of base portions 10 and 12, respectively. Bottom bearing plates 26 and 28 are vertically disposed between the side plates 22 and 24 and extend approximately half the height of the side plates. Cap screws 30 extend through the longitudinal flanges 14 and 16, through the side plates 22 and 24, and into the bearing plates 26 and 28 to securely fasten the members together. The bearing plates 26 and 28 are provided with bores 32 which constitute bearings or bearing journals for the ends of shaft 34 mounting a lower fluted feed roll 36, which will be described in more detail hereinafter. The shaft 34 is extended at one end 38 outwardly beyond bearing block 26 for mounting a handle 40, which can be secured in position by means including a slot and key arrangement generally designated 42.

An upper roll assembly for coacting with the fluted feed roll is provided. This includes a top cap 44 having two raised bosses 46 thereon, and being secured on top of and between side plates 22 and 24 by means of bolts 48. Top cap 44 is provided with bores 50 extending partially into the raised bosses 46, and terminating in smaller bores 52 in the raised boss. Carriage bolts 54 and 56 extend through the bores 50, 52, with their threaded ends upwardly directed. An elongated plate 58 having holes therethrough is suspended on the heads of bolts 54, 56. Helical springs 60 are interposed between the plate 58 and the upper extremity of the bores 50. The upper threaded ends of the bolts 54, 56 have wing nuts 62 engaged thereon.

A U-shaped bearing slide 64 is slidably inserted between the side plates 22 and 24 and has a longitudinally extending rectangular shaped slot 66 along the upper surface thereof. Bolts 68 extending through plate 58 are engaged in the material of the bearing slide for fastening the two together. The heads of bolts 54 and 56 are confined in the slot 66. It will be understood that upon turning of the wing nuts 62, the bearing slide 64 can be raised or lowered.

In legs 70 of U-shaped bearing slide 64, bores 72 are provided in which the ends of upper roller shaft 74 are mounted and fixed by means of set screws at 76. The upper or top roll 78 has end recesses mounting bearings 80 for rotation on shaft 74.

It will be noted that in the nip vicinity of the two rolls, substantially U-shaped cut-out areas 82 are provided in side plates 22 and 24. It is in this region between the rolls that the cutting or skiving action takes place and into which the cutting edge of the knife must extend.

The knife assembly includes stand members 84 and 86 mounted on top of end flanges 16, and secured thereto by means of bolts 88. The upstanding arms of these stand members are provided with bores 90 which serve as bearing journals. A substantially U-shaped knife support 92 is pivotally mounted by shafts 94 rotatably journaled in bores 90. This U-shaped support has an extended arm 96 thereon provided with a flat knife bed plate 98 on its upper surface, and an upstanding knife plate adjusting ledge 100 through which adjusting screws or bolts 102 pass.

The underside of elongated arm 96 is provided with spaced transverse grooves 104, and oval shaped slots 106 extending through to the upper surface of knife plate bed 98. A knife plate 108 having a substantially rectangular rearward portion and holes therethrough is supported on knife plate bed 98. Screws 110 pass through the holes as also the oval slots 106 and coact with nuts 112 of a rectangular configuration, mounted in the grooves 104, for adjustably securing the knife plate 108 to the knife plate bed 98 on elongated arm 96. Due to the provision of the oval slots and adjusting screws 102, the knife plate can be accurately positioned with reference to the nip area of the top and bottom rolls, as more clearly shown in Fig. 7 of the drawings. The knife edge 113, for proper operation, must be aligned parallel with a plane extending through the axes of the two rolls, and spaced approximately ⅛ inch distance from the plane through the roll axes.

Side plate 22 is provided with a slot 114 of oval configuration. A cylindrical bore or hole 116 is formed in bearing slide leg 70 opening into the slot 114. A cylindrical portion 118 of an eccentric member is rotatably journaled in the bore 116, and has a peripheral groove 120 into which a set screw 122 protrudes to positively position portion 118 transversely in the bore 116 as well as present rotation of member 118 therein. A shaft or stud portion 124 of the eccentric member, integral with the cylindrical portion 118, but having its axis eccentric with respect to the cylindrical portion's axis, extends through the slot 114. A stop plate 126 for the knife plate is pivotally mounted on stud 124 together with an extended boss 128. This stop plate 126 has a knife plate stop or nose 130 engageable with the upper surface of the knife plate 108 as shown in Fig. 4 of the drawings. The free end of elongated arm 96 has an opening through which a bolt 132 extends to a position in proximity to the outer surface of the stop plate 126. A stud 134 secured on plate 126, and the end of bolt 132, have a spring 136 connected therebetween.

When mounting the knife plate, the outer extremity 108a thereof is disposed outwardly of the outermost ends of the two rolls, and substantially in a plane passing vertically through the extended axes of the pivots of the U-shaped knife support. Due to this positioning, as the knife support and knife plate are rotated through an angle as will be discussed hereinafter, the outer extremity or outer knife edge point will remain in substantially fixed position with respect to the fluted feed roll. It is also to be noted that the knife edge at the outer extremity 108a is located substantially in a horizontal plane passing through the uppermost surface of the fluted feed roll. The fluted feed roll is provided with V-shaped grooves off-set at an angle to the center line and approximately 30° to provide the right-hand twist and flat upper surfaces. This insures proper feed of belt through the machine.

A belt guide 138 is secured on side plate 24 and has a pointed nose 140 extending into the nip region between the top and feed rolls to insure proper alignment and feed of the belt between the rolls for the scarfing or cutting operation.

Due to the construction of this machine, there is only one critical adjustment to be made before operation. This is the location of the knife edge as has been defined hereinabove. Additionally, by means of the eccentric member, the knife edge point can be properly positioned with respect to the top roll at its inner end 108b. Once this position is established, then through all operations of the machine, it may remain constant.

To operate the machine, scrap is first removed and the end of the belt to be cut is squared. The end of the belt is inserted into the machine with the squared end against the guide and the side of the belt is placed between the top and bottom rolls. Using the wing nuts at the top of the device, the top roll height is adjusted so that the distance between the rolls is slightly less than belt thickness, or so that a good bite is taken. Thereupon by turning the handle, the proper cutting or lap is effected.

Due to the arrangement of the pivot point of the outer edge of the knife plate, as discussed hereinabove, and due to the positioning and operation of the stop means and spring for the inner edge of the knife, as the relative height of the top roll is adjusted from the smallest spacing for the smallest belt thickness to a greater thickness of belt, the knife plate and knife edge will increase in angle with the outer edge maintaining its relative position with the fluted roll, and the inner edge maintaining its relative position with respect to the top roll. The stop or nose on the stop plate will positively position the inner side 108b of the plate upon adjustment of the bearing plate through turning of the wing nut, and in the reverse direction this is accomplished by the spring interconnecting the bolt and stud on the stop plate. To adjust the eccentric, and therefore the knife edge point, first set screw 122 is released and then the stud portion 124 is turned to adjust the angle. The set screw prevents turning of the eccentric and the position of the inner side or edge of the knife is fixed with respect to the top roll. It is only due to this plate arrangement that the angle of the knife blade or edge is automatically adjusted as the distance between the rolls is increased or decreased, while maintaining positively the position of the extremities of the knife plate and edge with the rolls to give the proper skive or cut. As the thickness of the belt increases, the angle also increases so that at all times a fixed length of cut preferably four inches is effected regardless of belt thickness in order to get proper point thickness.

Figs. 5 and 7 show the operation of the machine wherein a leather belt 142 is being scarfed to provide the desired cut. Fig. 9 shows the joining of two belt sections 142a and 142b to form a scarf joint 144.

Manifestly minor changes in details of construction will be apparent to those skilled in the art without departing from the spirit and scope of the invention as defined in and limited solely by the appended claims.

I claim:

1. In a scarfing machine, a fixed position lower roller, a rotatable vertically adjustable top roller, means floatingly mounting said top roll, springs suspending said mounting means for vertical movement thereof, a knife plate having the cutting edge thereof mounted in proximity to the bite of said rollers and means mounting said knife plate correlated with adjustment of said top roller for varying the angle of said knife plate dependent upon the spacing between said rollers.

2. In a scarfing machine as claimed in claim 1, a knife plate support, means pivotally mounting said support in proximity to one end of said rolls, a first lateral edge of said knife plate being positioned substantially in a vertical plane passing through the pivotal mount, means adjustably mounting the ends of said top roll, and means operatively interconnecting that mounting means remote from the pivotal mount and the second lateral edge of said knife plate and constraining and guiding angular movement of said knife on adjustment of roll spacing to maintain substantially fixed the proximity between said top roll and the edge of said knife plate at said second lateral edge, the edge of said knife plate at said first lateral edge maintaining substantially fixed proximity with said lower roll by the positioning with the pivotal mount.

3. In a scarfing machine as claimed in claim 2, said interconnecting means including a stop plate pivotally suspended from said top roll mounting means adjacent said second lateral edge, and movable therewith, an abutment on said stop plate in engagement with the upper surface of said knife plate adapted for depressing said second lateral edge upon downward adjustment of said top roll.

4. In a scarfing machine as claimed in claim 3, and a spring interconnecting said stop plate and the free end of said knife plate support adapted for raising said second lateral edge upon upward adjustment of said top roll.

5. In a scarfing machine as claimed in claim 4, an eccentric mounting for the stop plate pivot in the adjustable top roll mount, said eccentric mounting, upon actuation, adjusting the spacing between the knife edge, at said second lateral edge, and said top roll, through movement of said stop plate.

References Cited in the file of this patent

UNITED STATES PATENTS

| 169,930 | Tripp | Nov. 16, 1875 |
| 1,048,278 | Benjamin | Dec. 24, 1912 |
| 1,206,915 | Ricks et al. | Dec. 5, 1916 |
| 1,208,773 | Gouldbourn | Dec. 19, 1916 |
| 1,336,597 | Terry | Apr. 13, 1920 |
| 1,436,953 | Freeman | Nov. 28, 1922 |
| 1,638,915 | Bunker et al. | Aug. 16, 1927 |

FOREIGN PATENTS

| 540,794 | Germany | Dec. 30, 1931 |